US011900637B2

(12) United States Patent
Zuo (10) Patent No.: US 11,900,637 B2
(45) Date of Patent: Feb. 13, 2024

(54) IMAGE PROCESSING METHOD AND APPARATUS, AND STORAGE MEDIUM

(71) Applicant: BEIJING XIAOMI MOBILE SOFTWARE CO., LTD., Beijing (CN)

(72) Inventor: Cuilian Zuo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 239 days.

(21) Appl. No.: 17/205,520

(22) Filed: Mar. 18, 2021

(65) Prior Publication Data
US 2022/0036590 A1 Feb. 3, 2022

(30) Foreign Application Priority Data
Jul. 29, 2020 (CN) .......................... 202010747369.4

(51) Int. Cl.
*G06T 7/90* (2017.01)
*G06T 7/55* (2017.01)
*G06T 5/50* (2006.01)

(52) U.S. Cl.
CPC ............... *G06T 7/90* (2017.01); *G06T 5/50* (2013.01); *G06T 7/55* (2017.01)

(58) Field of Classification Search
CPC ..................................... G06T 7/90; G06T 7/55
(Continued)

(56) References Cited

U.S. PATENT DOCUMENTS

| 9,064,180 | B2 * | 6/2015 | Korichi | ................. | A61B 5/0059 |
| 9,111,339 | B1 * | 8/2015 | Huang | .................... | G06T 5/002 |
| 9,773,448 | B2 * | 9/2017 | Yata | ...................... | G09G 3/3225 |

FOREIGN PATENT DOCUMENTS

| CN | 1145553 A | * | 3/1997 | ........... G06F 17/148 |
| CN | 1637823 A | * | 7/2005 | ........... G09G 3/3648 |
(Continued)

OTHER PUBLICATIONS

"Hayat, Scalable 3D Terrain Visualization through Reversible JPEG2000-Based Blind Data Hiding, https://www.researchgate.net/publication/224347248_Scalable_3D_Terrain_Visualization_through_Reversible_JPEG2000-Based_Blind_Data_Hiding" (Year: 2008 ).*
(Continued)

*Primary Examiner* — Allen Porter
*Assistant Examiner* — Daniel Tehrani
(74) *Attorney, Agent, or Firm* — COZEN O'CONNOR (57) ABSTRACT

An image processing method includes: extracting a red, green and blue channel image and a white channel image from a target image; determining a first gray-scale component image of the red, green and blue channel image, and determining a second gray-scale component image of the white channel image; determining first decomposed sub-band information of the first gray-scale component image, and determining second decomposed sub-band information of the second gray-scale component image; determining third decomposed sub-band information according to the first decomposed sub-band information and the second decomposed sub-band information; performing image reconstruction according to the third decomposed sub-band information to obtain a third gray-scale component image, and constructing a color image corresponding to the target image according to the third gray-scale component image. An apparatus and storage medium incorporate the image processing method.

15 Claims, 3 Drawing Sheets

(58) Field of Classification Search
USPC .......................................................... 382/165
See application file for complete search history.

(56) References Cited

FOREIGN PATENT DOCUMENTS

| | | | |
|---|---|---|---|
| CN | 106447641 A | | 2/2017 |
| CN | 108389165 A | | 8/2018 |
| JP | 2004228952 A | * | 8/2004 |
| KR | 20110006112 A | * | 1/2011 |
| WO | WO2018040751 | * | 8/2018 |

OTHER PUBLICATIONS

Jee, S. et al. "Sensitivity and Resolution Improvement in RGBW Color Filter Array Sensor", Sensors, 18(5), 1647, May 21, 2018, pp. 1-18.

European Patent Application No. 21165486.8, extended Search and Opinion dated Aug. 26, 2021, 12 pages.

* cited by examiner

IMAGE PROCESSING METHOD AND APPARATUS, AND STORAGE MEDIUM

CROSS-REFERENCE TO RELATED APPLICATION

This application is based on and claims the benefit of priority to Chinese Patent Application Serial No. 202010747369.4, filed on Jul. 29, 2020, the entire contents of which are incorporated herein by reference.

TECHNICAL FIELD

The present disclosure relates to the technical field of data processing of mobile terminals, and in particular to an image processing method and apparatus and a storage medium.

BACKGROUND

With the continuous development of camera technology, traditional types of imaging sensors can no longer meet the new needs in imaging, and a variety of new imaging sensors are being developed, which can effectively combine the advantages of the images acquired among different channels of the image sensors and improve the quality of output images.

At present, the common sensors used in mobile terminals are with arrangement of RGGB arrays. Because only the narrow-band spectral energy can pass through the R, G, and B channels of the sensors with the traditional RGGB arrangement, the sensors can acquire less energy. When the image is taken under low illumination, the problems of low image brightness and low signal-to-noise ratio will occur.

SUMMARY

According to a first aspect of embodiments of the present disclosure, there is provided an image processing method, including:

extracting a red, green and blue channel image and a white channel image from a target image;

determining a first gray-scale component image of the red, green and blue channel image, and determining a second gray-scale component image of the white channel image;

determining first decomposed sub-band information of the first gray-scale component image, and determining second decomposed sub-band information of the second gray-scale component image; in which the first decomposed sub-band information includes at least one decomposition level, each decomposition level includes at least one frequency band, and each frequency band corresponds to a frequency band coefficient matrix; in which the second decomposed sub-band information includes at least one decomposition level, each decomposition level includes at least one frequency band, and each frequency band corresponds to a frequency band coefficient matrix;

determining third decomposed sub-band information according to the first decomposed sub-band information and the second decomposed sub-band information;

performing image reconstruction according to the third decomposed sub-band information to obtain a third gray-scale component image, and constructing a color image corresponding to the target image according to the third gray-scale component image.

According to a second aspect of embodiments of the present disclosure, there is provided an image processing apparatus, including:

a processor;

a memory configured to store instructions executable by the processor;

in which the processor is configured to execute the above described method.

According to a third aspect of embodiments of the present disclosure, there is provided a non-transitory computer-readable storage medium, in which instructions in the storage medium, when being executed by a processor of a mobile terminal, enable the mobile terminal to execute the method described above.

It should be understood that the above general description and the following detailed description are only exemplary and explanatory, and cannot limit the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

DETAILED DESCRIPTION

The exemplary embodiments will be described in detail here, and examples thereof are shown in the accompanying drawings. When the following description relates to the accompanying drawings, unless otherwise indicated, the same number in different Figures represents the same or similar elements. The implementation manners described in the following exemplary embodiments do not represent all implementation manners consistent with the present disclosure. Rather, they are only examples of apparatus and methods consistent with some aspects of the present disclosure as detailed in the appended claims.

Figure 1:
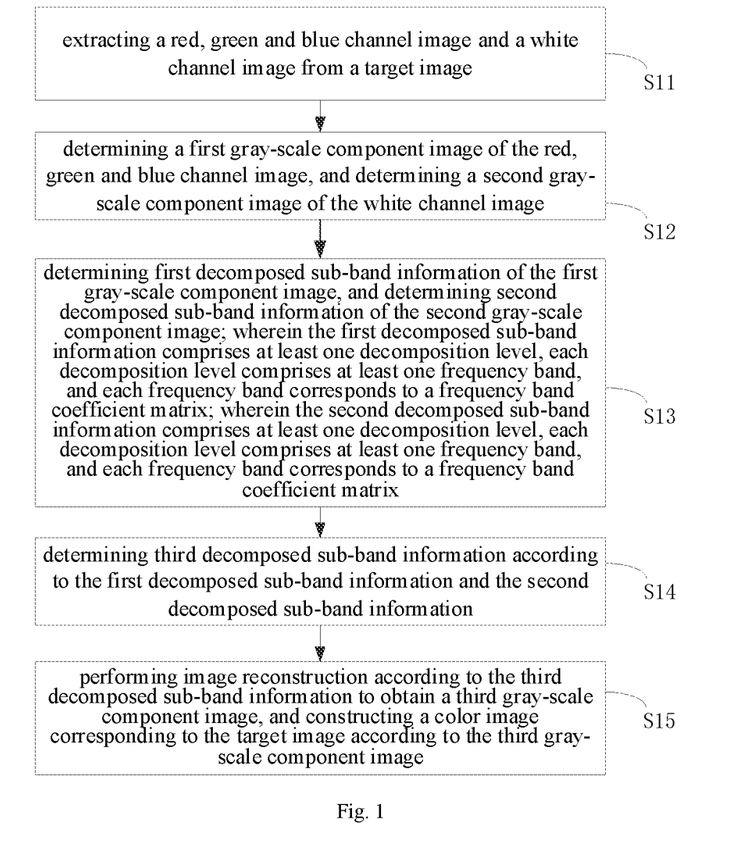
FIG. 1 is a flow chart of an image processing method shown according to an exemplary embodiment.

An embodiment of the present disclosure provides an image processing method. Referring to FIG. 1, which is a flowchart of an image processing method shown according to an exemplary embodiment, this method includes the following.

At S11, a red, green and blue channel image and a white channel image are extracted from a target image.

At S12, a first gray-scale component image of the red, green and blue channel image is determined, and a second gray-scale component image of the white channel image is determined.

At S13, first decomposed sub-band information of the first gray-scale component image is determined, and second decomposed sub-band information of the second gray-scale component image is determined. The first decomposed sub-band information includes at least one decomposition level, each decomposition level includes at least one frequency band, and each frequency band corresponds to a frequency band coefficient matrix. The second decomposed sub-band information includes at least one decomposition level, each decomposition level includes at least one frequency band, and each frequency band corresponds to a frequency band coefficient matrix.

At S14, third decomposed sub-band information is determined according to the first decomposed sub-band information and the second decomposed sub-band information.

At S15, image reconstruction is performed according to the third decomposed sub-band information to obtain a third gray-scale component image, and a color image corresponding to the target image is constructed according to the third gray-scale component image.

In the present embodiment, by extracting a first gray-scale component image of an RGB channel image and a second gray-scale component image of a W channel image from a target image, fusing the decomposed sub-band information of the two gray-scale component images, and compensating the RGB channel image by using the information of the W channel image, the signal-to-noise ratio of the image under low illumination can be improved, the overall brightness of the image can be increased, and the image quality can be improved.

In an embodiment, the target image in Si 1 may be an original RAW format image acquired and obtained by using an image sensor with red (R) primary color pixels, green (G) primary color pixels, blue (B) primary color pixels, and white (W) pixels. The original RAW format image acquired by this image sensor may include an RGB channel image and a W channel image. For example, this image sensor may be an image sensor with an RGBW array arrangement. The image sensor can acquire RGBW channel images, in which an RGBW channel image means an image with each pixel point composed of red (R) primary color pixels, green (G) primary color pixels, blue (B) primary color pixels, and white (W) pixels. Compared with a sensor based on the RGGB array arrangement, in a sensor with the RGBW array arrangement, part of the G channels is replaced with W (white) channels.

Figure 2:
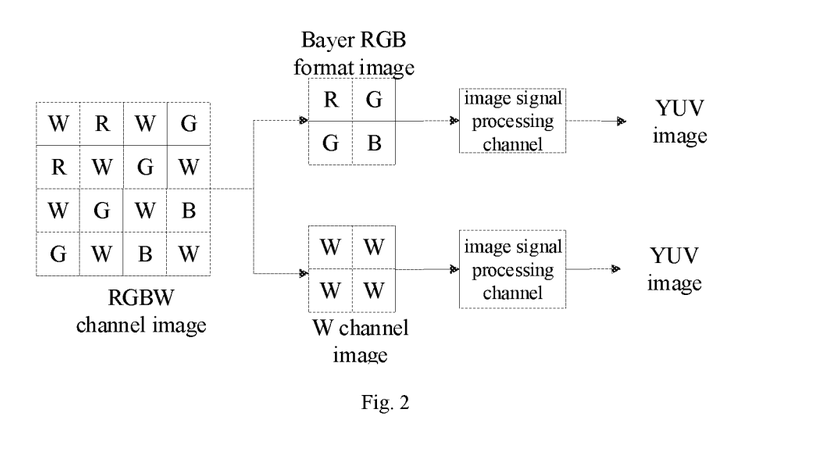
FIG. 2 is a schematic diagram of image extraction of RGBW channel images shown according to an exemplary embodiment.

In the case that the target image is an RGBW channel image, in S11, an RGB channel image (i.e., a red, green and blue channel image) and a W channel image (i.e., a white channel image) can be extracted from the RGBW channel image; for example, the RGB channel image can be, for example, a Bayer RGB format image. Then, in S11, the RGBW channel image data arranged in the RGBW array can be split into two-way data of Bayer RGB format image and W channel image. When splitting the RGBW channel image into the Bayer RGB format image and the W channel image, the binning operation of the pixel point values of the same type at the diagonal positions can be used, that is, the operation of adding and then dividing by two. As shown in FIG. 2, an RGBW channel image of size 4*4 is input, and after being split, the Bayer RGB format image and the white channel image with the size of 2*2 respectively are obtained. The Bayer RGB format image and the white channel image are processed through the respective image processing pipelines (ISP pipelines), respectively, and the processed YUV images are output respectively. Images of Y-channel are extracted from the two YUV images respectively, and the corresponding gray-scale component images are obtained. In the subsequent processing, image fusion processing can be performed based on the gray-scale component images.

The RGB channel image includes a R component, a G component and a B component. The RGB channel image can be formed in many ways. For example, each RGB channel image in a 2*2 RGGB format shown in FIG. 2 includes one R component, one B component and two G components. RGB channel images in other formats can include one R component, two B components and one G component, or include two R components, one B component and one G component. And the layout of the components is different from that shown in FIG. 2.

At S12, the image multi-scale decomposition method may be used to determine the decomposed sub-band information of the gray-scale component images. The image multi-scale decomposition method is used to decompose the original image into multiple images of different scales, in which the different decomposed images, which have been decomposed, express image information of different frequency bands. For example, in S12, a first image multi-scale decomposition method is used to determine a first decomposed sub-band information of a first gray-scale component image; a second image multi-scale decomposition method is used to determine a second decomposed sub-band information of a second gray-scale component image. The first image multi-scale decomposition method and the second image multi-scale decomposition method are the same or different.

At S15, constructing the color image corresponding to the target image according to the third gray-scale component image may include: using a chrominance component image and a color saturation component image in the YUV image of the third gray-scale component image corresponding to the RGB channel image to constructing a new YUV image, or using the chrominance component image and the color saturation component image in the YUV image of the third gray-scale component image corresponding to the RGB channel image to construct a new YUV image, and converting the YUV image to RGB image.

In this embodiment, the original RAW format image can be acquired from the image sensor with the RGBW array arrangement, the RGB channel image and the W channel image can be extracted from the original RAW format image, first decomposed sub-band information of the first gray-scale component image of the RGB channel image can be determined, second decomposed sub-band information of the second gray-scale component image of the W channel image can be determined, the two items of decomposed sub-band information are fused, and the information of the W channel image is used to compensate for the RGB channel image to improve the signal-to-noise ratio of the image under low illumination, improve the overall brightness of the image and improve the image quality.

When the RGBW channel image is processed using this embodiment, the signal-to-noise ratio of the fused image (for example, the fused RGB image) can be effectively improved, the overall brightness of the image can be improved, and the image quality can be improved. The specific analysis is as follows: Compared with the image sensor of the traditional RGGB structure, the energy of the full color spectrum can pass through the W channel of the image sensor of the RGBW structure. Therefore, under the same exposure time, a higher brightness can be obtained in the W channel. The conventional fusion method for the RGB channel and the W channel of the RGBW image sensor is as follows: the image acquired by the sensor arranged in the RGBW array is split into an RGB channel image and a W channel image, the RGB channel image and the W channel image are processed separately through the image processing pipeline (ISP pipeline), and the processed YUV format image is output. The weight given to the Y channel image in the YUV image corresponding to the RGB channel image is 0.5, and the weight given to the Y channel image in the YUV image corresponding to the W channel image is also 0.5. An image fusion is performed on the two Y channel images, and the chrominance component image and color saturation component image in the YUV image of the fused Y channel image corresponding to the RGB channel image are constructed into a new RGB image, thereby achieving the purpose of fusing the RGB channel information with the W channel information. This method of directly using the same weight for the Y channel image corresponding to the RGB channel image and the Y channel image corresponding to the W channel image will cause a significant decrease in image contrast and loss of image details, which has a greater impact on image quality. Therefore, after processing the RGBW image using the method in this embodiment, the signal-to-noise ratio of the fused image (for example, the fused RGB image) can be effectively improved, the overall brightness of the image can be improved, and the image quality can be improved.

An embodiment of the present disclosure provides an image processing method, which includes the method shown in FIG. 1, and the multi-scale image processing algorithm can be a multi-scale image processing algorithm based on wavelet transform, or can be a multi-scale image processing algorithm based on Laplacian Pyramid.

Image multi-scale processing algorithms include image multi-scale decomposition algorithm and image multi-scale reconstruction algorithm. The image multi-scale reconstruction algorithm is the reverse algorithm of the image multi-scale decomposition algorithm.

Different wavelet bases can be used in the multi-scale image processing algorithm of wavelet transform. For example, the available wavelet bases may include one of the following: Haar, Daubechies, Biorthogonal, Coiflets, Symlets, Morlet, Mexican.

In the multi-scale image decomposition algorithm of wavelet transform, in the first decomposition level, the image is decomposed into one low-band sub-image and three high-band sub-images to obtain one low-band wavelet coefficient matrix and three high-band wavelet coefficient matrices. In the subsequent decomposition levels, the low-band image in the previous decomposition level is continuously decomposed into one low-band sub-image and three high-band sub-images, and so on.

The method of calculating the multi-scale coefficients of an image using the multi-scale image decomposition algorithm based on wavelet transform may include:

decomposing the image into one low-band sub-image and three high-band sub-images to obtain one low-band wavelet coefficient matrix and three high-band wavelet coefficient matrices. The low-band wavelet coefficient matrix corresponds to the LL frequency band, which is a frequency band containing low frequency information of the image. The three high-band wavelet coefficient matrices respectively correspond to the HH frequency band, the LH frequency band and the HL frequency band. Among them, the HH frequency band is a frequency band containing diagonal high frequency information of the image, the LH frequency band is a frequency band containing high frequency information of the image in the horizontal direction, and the HL frequency band is a frequency band containing high frequency information of the image in the vertical direction.

Therefore, in the first decomposition level, one low-band wavelet coefficient matrix is included, which includes the coefficient of each pixel point on the low-band image. $X_{LL,1}(i,j)$ is used to represent the coefficient of the pixel point (i, j) in the decomposed image corresponding to the LL frequency band of the first decomposition level, where i represents the row position of the current pixel in the corresponding image, and j represents the column position of the current pixel in the corresponding image.

In the first decomposition level, also three high-band wavelet coefficient matrices are included, which respectively are $X_{HH,1}(i,j)$, $X_{LH,1}(i,j)$, $X_{HL,1}(i,j)$.

Where $X_{HH,1}(i,j)$ represents the coefficient of the pixel point (i, j) in the decomposed image corresponding to the HH frequency band of the first decomposition level; $X_{LH,1}(i,j)$ represents the coefficient of the pixel point (i, j) in the decomposed image corresponding to the LH frequency band of the first decomposition level; $X_{HL,1}(i,j)$ represents the coefficient of the pixel point (i, j) in the decomposed image corresponding to the HL frequency band of the first decomposition level. The coefficients of the respective frequency bands of other decomposition levels will be expressed in the same way.

In the second decomposition level, the low-band wavelet image obtained in the first decomposition level is continuously decomposed into one low-band sub-image and three high-band sub-images to obtain one low-band wavelet coefficient matrix and three high-band wavelet coefficient matrices.

Thus in the second decomposition level, one low-band wavelet coefficient matrix, which is denoted as $X_{LL,2}(i,j)$, and three high-band wavelet coefficient matrices, which respectively are $X_{HH,2}(i,j)$, $X_{LH,2}(i,j)$, $X_{HL,2}(i,j)$.

In the third decomposition level, the low-band wavelet image obtained in the second decomposition level is continuously decomposed into one low-band sub-image and three high-band sub-images to obtain one low-band wavelet coefficient matrix and three high-band wavelet coefficient matrices.

Thus in the third decomposition level, one low-band wavelet coefficient matrix, which is denoted as $X_{LL,3}(i,j)$, and three high-band wavelet coefficient matrices, which respectively are $X_{HH,3}(i,j)$ $X_{LH,3}(i,j)$, $X_{HL,3}(i,j)$.

And so on.

The principle of the image pyramid method is: the original image is decomposed into a multi-scale pyramid image sequence, in which the low-resolution image is in the upper level, the high-resolution image is in the lower level, and the size of the image of the upper level is ¼ of the size of the image of the previous level. The pyramid of all the images is fused on the corresponding levels with certain rules, so that a synthesized pyramid can be obtained, and then the synthesized pyramid is reconstructed according to the inverse process of the pyramid generation to obtain the fused pyramid.

An embodiment of the present disclosure provides an image processing method, which includes the method shown in FIG. 1, and determining the first decomposed sub-band information of the first gray-scale component image, and determining the second decomposed sub-band information of the second gray-scale component image in S12 may include:

using an image multi-scale decomposition method to determine the first decomposed sub-band information of the first gray-scale component image and determine the second decomposed sub-band information of the second gray-scale component image.

The number of decomposition levels in the first decomposed sub-band information and the number of decomposition levels in the second decomposed sub-band information are the same, and the number of frequency bands in each decomposition level is the same.

For example, using the image multi-scale decomposition method of wavelet transform based on Haar wavelet base, the first gray-scale component image is decomposed in three levels to obtain three decomposition levels, and each decomposition level corresponds to frequency band coefficients of four frequency bands.

In an example, using the multi-scale image processing algorithm based on wavelet transform to calculate the multi-scale decomposed sub-band information of the Y-channel image corresponding to the Bayer RGB format image includes: $X_{HH,1}^{RGB}(i,j)$, $X_{LH,1}^{RGB}(i,j)$, $X_{HL,1}^{RGB}(i,j)$, $X_{HH,2}^{RGB}(i,j)$, $X_{LH,2}^{RGB}(i,j)$, $X_{HL,2}^{RGB}(i,j)$, $X_{HH,3}^{RGB}(i,j)$, $X_{LH,3}^{RGB}(i,j)$, $X_{HL,3}^{RGB}(i,j)$, $X_{LL,3}^{RGB}(i,j)$. Because $X_{LL,1}^{RGB}(i,j)$ in the first decomposition level is decomposed into four coefficients in the second decomposition level, the multi-scale decomposed sub-band information of the RGB channel image does not include $X_{LL,1}^{RGB}(i,j)$. In the same way, because $X_{LL,2}^{RGB}(i,j)$ in the second decomposition level is decomposed into four coefficients in the third decomposition level, the multi-scale decomposed sub-band information of the RGB channel image does not include $X_{LL,2}^{RGB}(i,j)$.

$X_{HH,1}^{RGB}(i,j)$ represents the coefficient of the pixel point (i, j) in the decomposed image of the RGB channel image corresponding to the HH frequency band of the first decomposition level; $X_{LH,1}^{RGB}(i,j)$ represents the coefficient of the pixel point (i, j) in the decomposed image of the RGB channel image corresponding to the LH frequency band of the first decomposition level; $X_{HL,1}^{RGB}(i,j)$ represents the coefficient of the pixel point (i, j) in the decomposed image of the RGB channel image corresponding to the HL frequency band of the first decomposition level. $X_{LL,1}^{RGB}(i,j)$ represents the coefficient of the pixel point (i, j) in the decomposed image of the RGB channel image corresponding to the LL frequency band of the first decomposition level. The coefficients of the respective frequency bands of other decomposition levels will be expressed in the same way.

Using the multi-scale image decomposition algorithm based on wavelet transform to calculate the multi-scale decomposed sub-band information of the Y-channel image corresponding to the W channel image includes: $X_{HH,1}^{W}(i,j)$, $X_{LH,1}^{W}(i,j)$, $X_{HL,1}^{W}(i,j)$, $X_{HH,2}^{W}(i,j)$, $X_{LH,2}^{W}(i,j)$, $X_{HL,2}^{W}(i,j)$, $X_{HH,3}^{W}(i,j)$, $X_{LH,3}^{W}(i,j)$, $X_{HL,3}^{W}(i,j)$, $X_{LL,3}^{W}(i,j)$.

$X_{HH,1}^{W}(i,j)$ represents the coefficient of the pixel point (i, j) in the decomposed image of the W channel image corresponding to the HH frequency band of the first decomposition level; $X_{LH,1}^{W}(i,j)$ represents the coefficient of the pixel point (i, j) in the decomposed image of the W channel image corresponding to the LH frequency band of the first decomposition level; $X_{HL,1}^{W}(i,j)$ represents the coefficient of the pixel point (i, j) in the decomposed image of the W channel image corresponding to the HL frequency band of the first decomposition level. $X_{LL,1}^{W}(i,j)$ represents the coefficient of the pixel point (i, j) in the decomposed image of the W channel image corresponding to the LL frequency band of the first decomposition level. The coefficients of the respective frequency bands of other decomposition levels will be expressed in the same way.

In another embodiment, different image multi-scale decomposition methods are used to determine the first decomposed sub-band information of the first gray-scale component image and to determine the second decomposed sub-band information of the second gray-scale component image. For example, a first decomposition method is used to determine the first decomposed sub-band information of the first gray-scale component image, and a second decomposition method is used to determine the second decomposed sub-band information of the second gray-scale component image. The first decomposition method and the second decomposition method both are based on Wavelet transform of the same wavelet base, but the number of the decomposition levels of the first decomposition method is different from the number of the decomposition levels of the second decomposition method.

Figure 5:
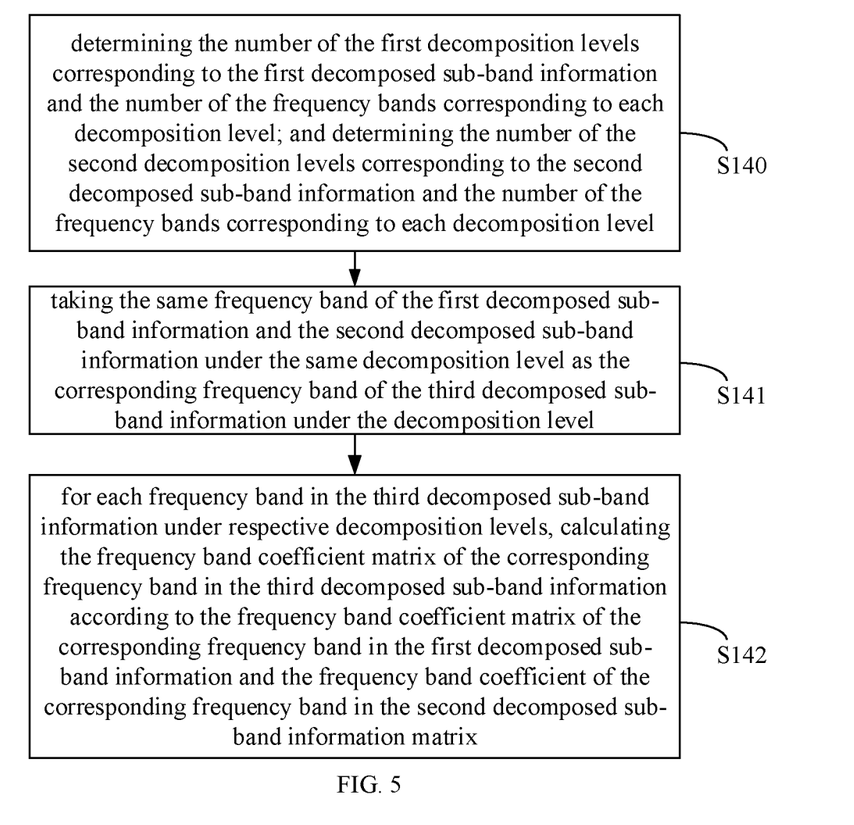
FIG. 5 is a flow chart of a method of determining third decomposed sub-band information according to an exemplary embodiment.

An embodiment of the present disclosure provides an image processing method, which includes the method shown in FIG. 1, and determining the third decomposed sub-band information according to the first decomposed sub-band information and the second decomposed sub-band information in S14 may include S141, S142 and S143, shown in more detail in FIG. 5.

At S141, the same frequency band of the first decomposed sub-band information and the second decomposed sub-band information under the same decomposition level is taken as the corresponding frequency band of the third decomposed sub-band information under the decomposition level.

At S142, for each frequency band in the third decomposed sub-band information under respective decomposition levels, the frequency band coefficient matrix of the corresponding frequency band in the third decomposed sub-band information is calculated according to the frequency band coefficient matrix of the corresponding frequency band in the first decomposed sub-band information and the frequency band coefficient of the corresponding frequency band in the second decomposed sub-band information matrix.

In an embodiment, before S141, it may further include S140 of determining the number of the first decomposition levels corresponding to the first decomposed sub-band information and the number of the frequency bands corresponding to each decomposition level; and determining the number of the second decomposition levels corresponding to the second decomposed sub-band information and the number of the frequency bands corresponding to each decomposition level.

When the number of decomposition levels in the first decomposed sub-band information and the number of decomposition levels in the second decomposed sub-band information are different, but the number of the corresponding frequency bands in at least one decomposition level is the same, in S141, the same frequency bands of the first decomposed sub-band information and the second decomposed sub-band information under the same decomposition level may be determined.

For example, in S140, the number of the first decomposition levels corresponding to the first decomposed sub-band information is 3, and each decomposition level corresponds to 4 frequency bands. The frequency bands corresponding to the first decomposition level are the LL frequency band, the LH frequency band, the HL frequency band and the HH frequency band under the first decomposition level, respectively; and the four frequency bands corresponding to the second decomposition level are the LL frequency band, the LH frequency band, the HL frequency band and the HH frequency band under the second decomposition level, respectively; the four frequency bands corresponding to the third decomposition level are the LL frequency band, the LH frequency band, the HL frequency band and the HH frequency band under the third decomposition level, respectively.

The number of the second decomposition levels corresponding to the second decomposed sub-band information is 2, and each decomposition level corresponds to 4 frequency bands. The frequency bands corresponding to the first decomposition level are the LL frequency band, the LH frequency band, the HL frequency band and the HH frequency band under the first decomposition level, respectively; and the four frequency bands corresponding to the second decomposition level are the LL frequency band, the LH frequency band, the HL frequency band and the HH frequency band under the second decomposition level, respectively.

In this example, in S141, it is determined that the same frequency bands of the first decomposed sub-band information and the second decomposed sub-band information under the same decomposition level may include: four frequency bands under the first decomposition level, and four frequency bands under the second decomposition level. Thus, it is determined that the third decomposed sub-band information includes two decomposition levels, and each decomposition level includes four frequency bands.

In an embodiment, when the number of the decomposition levels in the first decomposed sub-band information and the second decomposed sub-band information are the same, and the number of the frequency bands corresponding to each decomposition level number is also the same, the number of the decomposition levels in the third decomposed sub-band information is determined as the number of the decomposition levels of the first decomposed sub-band information or the second decomposed sub-band information, and the number of the frequency bands corresponding to each decomposition level in the third decomposed sub-band information is determined as the number of the frequency bands in the corresponding decomposition level in the first decomposed sub-band information or the second decomposed sub-band information.

In S142, when calculating the frequency band coefficient matrix of one frequency band in the third decomposed sub-band information, the frequency band coefficient matrix corresponding to the same frequency band in the first decomposed sub-band information and the second decomposed sub-band information may be used for calculation.

For example, the frequency band coefficient matrix of the HH frequency band of the first decomposition level in the first decomposed sub-band information, and the frequency band coefficient matrix of the HH frequency band of the first decomposition level in the second decomposed sub-band information, are used to calculate the frequency band coefficient matrix of the HH frequency band of the first decomposition level in the third decomposed sub-band information.

The frequency band coefficient matrix of the LL frequency band of the second decomposition level in the first decomposed sub-band information, and the frequency band coefficient matrix of the LL frequency band of the second decomposition level in the second decomposed sub-band information, are used to calculate the frequency band coefficient matrix of the LL frequency band of the second decomposition level in the third decomposed sub-band information.

An embodiment of the present disclosure provides an image processing method, which includes the method shown in FIG. 1, and determining the third decomposed sub-band information according to the first decomposed sub-band information and the second decomposed sub-band information in S14 may include:

for a set high frequency band in the third decomposed sub-band information, determining the frequency band coefficient matrix of the set high frequency band in the second decomposed sub-band information as the frequency band coefficient matrix of the set corresponding high frequency band in the third decomposed sub-band information; and for each frequency band in the third decomposed sub-band information except the set high frequency band, determining the coefficient value corresponding to each pixel point in the frequency band coefficient matrix of each frequency band in the third decomposed sub-band information, as the average value of the coefficient value of the corresponding pixel point in the frequency band coefficient matrix of the corresponding frequency band in the first decomposed sub-band information and the coefficient value of the corresponding pixel point in the frequency band coefficient matrix of the corresponding frequency band in the second decomposed sub-band information.

In this embodiment, under different circumstances, one or more different frequency bands in the third decomposed sub-band information may be set as the set high frequency band.

In one embodiment, the first decomposed sub-band information and the second decomposed sub-band information are decomposed sub-band information obtained based on the image multi-scale decomposition method of wavelet transform. The set high frequency band is the HH frequency band in the first decomposition level.

For the set high frequency band, the frequency band coefficient matrix of the set high frequency band corresponding to the second decomposed sub-band information of the W channel image is used as the frequency band coefficient matrix of the set high frequency band of the third decomposed sub-band information. That is, for the HH frequency band in the first decomposition level:

$$X_{HH,1}^{F}(i,j) = X_{HH,1}^{W}(i,j).$$

$X_{HH,1}^{F}(i,j)$ represents the frequency band coefficients on the pixel point (i, j) in the decomposed image in the third decomposed sub-band information corresponding to the HH frequency band of the first decomposition level. About the frequency band coefficients corresponding to other decomposition levels and other frequency bands in the third decomposed sub-band information, the same goes.

For each frequency band in the third decomposed sub-band information except the set high frequency band, determining the coefficient value corresponding to each pixel point in the frequency band coefficient matrix of each frequency band in the third decomposed sub-band information, as the average value of the coefficient value of the corresponding pixel point in the frequency band coefficient matrix of the corresponding frequency band in the first decomposed sub-band information and the coefficient value of the corresponding pixel point in the frequency band coefficient matrix of the corresponding frequency band in the second decomposed sub-band information.

In an example, for the LH frequency band in the first decomposition level:

$$X_{LH,1}^{F}(i,j) = \frac{X_{LH,1}^{W}(i,j) + X_{LH,1}^{RGB}(i,j)}{2}$$

For the HL frequency band in the first decomposition level:

$$X_{HL,1}^{F}(i,j) = \frac{X_{HL,1}^{W}(i,j) + X_{HL,1}^{RGB}(i,j)}{2}$$

For the HH frequency band in the second decomposition level, that is, the HH frequency band in the first decomposition level under the LL frequency band:

$$X_{HH,2}^{F}(i, j) = \frac{X_{HH,2}^{W}(i, j) + X_{HH,2}^{RGB}(i, j)}{2}$$

For the LH frequency band in the second decomposition level, that is, the LH frequency band in the first decomposition level under the LL frequency band:

$$X_{LH,2}^{F}(i, j) = \frac{X_{LH,2}^{W}(i, j) + X_{LH,2}^{RGB}(i, j)}{2}$$

For the HL frequency band in the second decomposition level, that is, the HL frequency band in the first decomposition level under the LL frequency band:

$$X_{HL,2}^{F}(i, j) = \frac{X_{HL,2}^{W}(i, j) + X_{HL,2}^{RGB}(i, j)}{2}$$

For the HH frequency band in the third decomposition level, that is, the HH frequency band in the second decomposition level under the LL frequency band:

$$X_{HH,3}^{F}(i, j) = \frac{X_{HH,3}^{W}(i, j) + X_{HH,3}^{RGB}(i, j)}{2}$$

For the LH frequency band in the third decomposition level, that is, the LH frequency band in the second decomposition level under the LL frequency band:

$$X_{LH,3}^{F}(i, j) = \frac{X_{LH,3}^{W}(i, j) + X_{LH,3}^{RGB}(i, j)}{2}$$

For the HL frequency band in the third decomposition level, that is, the HL frequency band in the second decomposition level under the LL frequency band:

$$X_{HL,3}^{F}(i, j) = \frac{X_{HL,3}^{W}(i, j) + X_{HL,3}^{RGB}(i, j)}{2}$$

For the LL frequency band in the third decomposition level, that is, the LL frequency band in the second decomposition level under the LL frequency band:

$$X_{LL,3}^{F}(i, j) = \frac{X_{LL,3}^{W}(i, j) + X_{LL,3}^{RGB}(i, j)}{2}$$

$X_{HH,3}^{F}(i,j)$ represents the coefficient of the pixel point (i, j) in the decomposed image of the third decomposed sub-band information corresponding to the HH frequency band of the third decomposition level. $X_{LH,3}^{F}(i,j)$ represents the coefficient of the pixel point (i, j) in the decomposed image of the third decomposed sub-band information corresponding to the LH frequency band of the third decomposition level. $X_{HL,3}^{F}(i,j)$ represents the coefficient of the pixel point (i, j) in the decomposed image of the third decomposed sub-band information corresponding to the HL frequency band of the third decomposition level. $X_{LL,3}^{F}(i,j)$ represents the coefficient of the pixel point (i, j) in the decomposed image of the third decomposed sub-band information corresponding to the LL frequency band of the third decomposition level.

In one embodiment, it is determined that the frequency bands corresponding to the set high frequency band include the HH frequency band, the LH frequency band, and the HL frequency band in the first decomposition level.

For the set high frequency band, the frequency band coefficient matrix of the set high frequency band corresponding to the first decomposed sub-band of the W channel image is used as the frequency band coefficient matrix of the set high frequency band of the third decomposed sub-band. That is, for the HH frequency band, the LH frequency band and the HL frequency band in the first decomposition level:

$$X_{HH,1}^{F}(i,j) = X_{HH,1}^{W}(i,j)$$

$$X_{LH,1}^{F}(i,j) = X_{LH,1}^{W}(i,j)$$

$$X_{HL,1}^{F}(i,j) = X_{HL,1}^{W}(i,j)$$

For each frequency band except the set high frequency band, determining the coefficient value corresponding to each pixel point in the frequency band coefficient matrix of each frequency band in the third decomposed sub-band information, as the average value of the coefficient value of the corresponding pixel point in the frequency band coefficient matrix of the corresponding frequency band in the first decomposed sub-band information and the coefficient value of the corresponding pixel point in the frequency band coefficient matrix of the corresponding frequency band in the second decomposed sub-band information.

An embodiment of the present disclosure provides an image processing method, which includes the method shown in FIG. 1, and determining the third decomposed sub-band information according to the first decomposed sub-band information and the second decomposed sub-band information in S14 may include:

determining the frequency band coefficient matrix of the third decomposed sub-band information in each frequency band, as the sum of a first matrix, which is a product of a corresponding weighting coefficient with the frequency band coefficient matrix of the first decomposed sub-band information on the corresponding frequency band, and a second matrix, which is a product of a corresponding weighting coefficient with the frequency band coefficient matrix of the second decomposed sub-band information on the corresponding frequency band.

The sum of the corresponding weighting coefficients of the first decomposed sub-band information and the second decomposed sub-band information on the same frequency band is 1, and the corresponding weighting coefficient of the second decomposed sub-band information on the set high frequency band is greater than corresponding weighting coefficients on frequency bands other than the set high frequency band.

For example, when the number of the decomposition levels of wavelet transform is 3, the set high frequency band is the HH frequency band in the first decomposition level. The corresponding weighting coefficient of the second decomposed sub-band information of the W channel image on the set high frequency band is 0.98. The corresponding weighting coefficients on the frequency bands except the high frequency band are 0.5, or 0.6, or 0.55, etc.

In an example, the set high frequency band is the HH frequency band in the first decomposition level.

For the HH frequency band in the first decomposition level:

$$X_{HH,1}^{F}(i,j)=0.98*X_{HH,1}^{W}(i,j)+0.02/X_{HH,1}^{RGB}(i,j)$$

For the LH frequency band in the first decomposition level:

$$X_{LH,1}^{F}(i,j)=0.6*X_{LH,1}^{W}(i,j)+0.4*X_{LH,1}^{RGB}(i,j)$$

For the HL frequency band in the first decomposition level:

$$X_{HL,1}^{F}(i,j)=0.6*X_{HL,1}^{W}(i,j)+0.4*X_{HL,1}^{RGB}(i,j)$$

And so on.

An embodiment of the present disclosure provides an image processing method, which includes the method shown in FIG. 1, and determining the third decomposed sub-band information according to the first decomposed sub-band information and the second decomposed sub-band information in S14 may include:

determining the frequency band coefficient matrix of the third decomposed sub-band information in each frequency band, as the sum of a third matrix, which is a product of a corresponding weighting coefficient with the frequency band coefficient matrix of the first decomposed sub-band information on the corresponding frequency band, and a fourth matrix, which is a product of a corresponding weighting coefficient with the frequency band coefficient matrix of the second decomposed sub-band information on the corresponding frequency band.

The sum of the corresponding weighting coefficients of the first decomposed sub-band information and the second decomposed sub-band information on the same frequency band is 1; and the corresponding weighting coefficient of the second decomposed sub-band information on a frequency band is negatively correlated to the number of decomposition levels to which the frequency band belongs.

For example, when the number of the decomposition levels of wavelet transform is 3, the corresponding weighting coefficient of the second decomposed sub-band information on the frequency band negatively correlated to the number of the decomposition levels to which the frequency band belongs.

For example, the weighting coefficients corresponding to the HH frequency band, the LH frequency band, the HL frequency band and the HH frequency band in the first decomposition level are all greater than the weight coefficients corresponding to the HH frequency band, the LH frequency band, the HL frequency band and the HH frequency band in the second decomposition level.

The weighting coefficients corresponding to the HH frequency band, the LH frequency band, the HL frequency band and the HH frequency band in the second decomposition level are all greater than the weight coefficients corresponding to the HH frequency band, the LH frequency band, the HL frequency band and the HH frequency band in the third decomposition level.

An embodiment of the present disclosure provides an image processing method, which includes the method shown in FIG. 1, and determining the third decomposed sub-band information according to the first decomposed sub-band information and the second decomposed sub-band information in, S14 may include the following.

For a set high frequency band in the third decomposed sub-band information, the frequency band coefficient of the set high frequency band in the second decomposed sub-band information is determined as the frequency band coefficient of the set corresponding high frequency band in the third decomposed sub-band information.

For each frequency band in the third decomposed sub-band information except the set high frequency band, the following operations are performed.

For a set high frequency band in the third decomposed sub-band information, the frequency band coefficient matrix of the set high frequency band in the second decomposed sub-band information is determined as the frequency band coefficient matrix of the set corresponding high frequency band in the third decomposed sub-band information.

For each frequency band in the third decomposed sub-band information except the set high frequency band, the frequency band coefficient matrix of the third decomposed sub-band information in each frequency band is determined as the sum of a fifth matrix, which is a product of a corresponding weighting coefficient with the frequency band coefficient matrix of the first decomposed sub-band information on the corresponding frequency band, and a sixth matrix, which is a product of a corresponding weighting coefficient with the frequency band coefficient matrix of the second decomposed sub-band information on the corresponding frequency band.

The sum of the corresponding weighting coefficients of the first decomposed sub-band information and the second decomposed sub-band information on the same frequency band is 1; and the corresponding weighting coefficient of the second decomposed sub-band information on a frequency band is negatively correlated to the number of decomposition levels to which the frequency band belongs.

For example, when the number of the decomposition levels of wavelet transform is 3, it is determined that the high frequency band is the HH frequency band in the first decomposition level. The frequency band coefficient of the HH frequency band in the first decomposition level in the second decomposed sub-band information of the W channel image is used as the frequency band coefficient of the HH frequency band in the first decomposition level in the third decomposed sub-band information.

The weighting coefficients corresponding to the HH frequency band, the LH frequency band, the HL frequency band and the HH frequency band in the first decomposition level are all greater than the weight coefficients corresponding to the HH frequency band, the LH frequency band, the HL frequency band and the HH frequency band in the second decomposition level.

The weighting coefficients corresponding to the HH frequency band, the LH frequency band, the HL frequency band and the HH frequency band in the second decomposition level are all greater than the weight coefficients corresponding to the HH frequency band, the LH frequency band, the HL frequency band and the HH frequency band in the third decomposition level.

An embodiment of the present disclosure provides an image processing method, which includes the method shown in FIG. 1, and determining the third decomposed sub-band information according to the first decomposed sub-band information and the second decomposed sub-band information in S14 may include:

determining the frequency band coefficient matrix of each frequency band in the third decomposed sub-band information is the sum of a seventh matrix, which is a dot product matrix of the frequency band coefficient matrix of the corresponding frequency band in the first decomposed sub-band information with the weighting coefficient matrix of the corresponding frequency band in the first decomposed sub-band information, and an eighth matrix, which is a dot product matrix of the frequency band coefficient matrix of the corresponding frequency band in the second decomposed sub-band information with the weighting coefficient matrix of the corresponding frequency band in the second decomposed sub-band information.

The weighting coefficient value of each pixel point in the weighting coefficient matrix of each frequency band in the first decomposed sub-band information is calculated and obtained according to a first variance corresponding to each pixel point in the decomposed image of the first gray-scale component image in the corresponding frequency band The weighting coefficient value of each pixel point in the weighting coefficient matrix of each frequency band in the second decomposed sub-band information is calculated and obtained according to a second variance corresponding to each pixel point in the decomposed image of the second gray-scale component image in the corresponding frequency band.

The sum of the weighting coefficients corresponding to the same pixel point in the decomposed images of the first gray-scale component image and the second gray-scale component image in the same frequency band is 1; the weighting coefficient corresponding to each pixel point in the decomposed image of the first gray-scale component image on each frequency band is positively correlated with the first variance corresponding to the corresponding pixel point, and the weighting coefficient corresponding to each pixel point in the decomposed image of the second gray-scale component image on each frequency band is positively correlated with the second variance corresponding to the corresponding pixel point.

The first variance and the second variance corresponding to a pixel point are both a variance value of the pixel value within an area of a set size (for example, a 3 by 3 area, or a 5 by 5 area, or a 7 by 7 area) centered on each pixel point.

In an embodiment, the ratio of the first variance to the second variance corresponding to each pixel point is equal to the ratio of the weighting coefficient corresponding to this pixel point in the decomposed image of the first gray-scale component image on this frequency band to the weighting coefficient corresponding to the corresponding pixel point in the decomposed image of the second gray-scale component image on this frequency band, on the corresponding pixel point.

For example: For the HH frequency band in the first decomposition level:

$$\frac{T_{HH,1}^{W}(i,j)}{T_{HH,1}^{RGB}(i,j)} = \frac{D_{HH,1}^{W}(i,j)}{D_{HH,1}^{RGB}(i,j)}$$

$T_{HH,1}^{W}(i,j)$ refers to the weighting coefficient corresponding to the pixel point (i, j) in the decomposed image of the second gray-scale component image in this frequency band, in the HH frequency band of the first decomposition level.

$T_{HH,1}^{RGB}(i,j)$ refers to the weighting coefficient corresponding to the pixel point (i, j) in the decomposed image of the second gray-scale component image in this frequency band, in the HH frequency band of the first decomposition level.

$D_{HH,1}^{W}(i,j)$ refers to the second variance on the pixel point (i, j) in the decomposed image of the second gray-scale component image in this frequency band, in the HH frequency band of the first decomposition level.

$D_{HH,1}^{RGB}(i,j)$ refers to the first variance on the pixel point (i, j) in the decomposed image of the first gray-scale component image in this frequency band, in the HH frequency band of the first decomposition level.

For example, when the number of the decomposition levels of wavelet transform is 2, using the multi-scale image decomposition algorithm based on wavelet transform to calculate the first decomposed sub-band information of the first gray-scale component image includes: $X_{HH,1}^{RGB}(i,j)$, $X_{LH,1}^{RGB}(i,j)$, $X_{HL,1}^{RGB}(i,j)$, $X_{HH,2}^{RGB}(i,j)$, $X_{LH,2}^{RGB}(i,j)$, $X_{HL,2}^{RGB}(i,j)$, $X_{LL,2}^{RGB}(i,j)$.

When the number of the decomposition levels of wavelet transform is 2, using the multi-scale image decomposition algorithm based on wavelet transform to calculate the second decomposed sub-band information of the second gray-scale component image includes: $X_{HH,1}^{W}(i,j)$, $X_{LH,1}^{W}(i,j)$, $X_{HL,1}^{W}(i,j)$, $X_{HH,2}^{W}(i,j)$, $X_{LH,2}^{W}(i,j)$, $X_{HL,2}^{W}(i,j)$, $X_{LL,2}^{W}(i,j)$.

For a pixel point in a frequency band, according to the first variance and the second variance corresponding to this pixel point, on the corresponding pixel point, the weighting coefficient corresponding to this pixel point in the decomposed image of the first gray-scale component image in this frequency band, and the weighting coefficient corresponding to this pixel point in the decomposed image of the second gray-scale component image in this frequency band, are determined. For example: The calculation method for the HH frequency band in the first decomposition level is:

$$X_{HH,1}^{F}(i,j), T_{HH,1}^{W}(i,j)*X_{HH,1}^{W}(i,j)+T_{HH,1}^{RGB}(i,j)*X_{HH,1}^{RGB}(i,j)$$

The calculation method for the LH frequency band in the first decomposition level is:

$$X_{LH,1}^{F}(i,j)=T_{LH,1}^{W}(i,j)*X_{LH,1}^{W}(i,j)+T_{LH,1}^{RGB}(i,j)*X_{LH,1}^{RGB}(i,j)$$

The calculation methods for other frequency bands in the first decomposition level and each frequency band in the second decomposition level are the same as the above calculation methods.

Regarding the apparatuses in the foregoing embodiments, the specific manner in which the respective modules perform an operation has been described in detail in the embodiments relating to the method, and a detailed description and explanation will not be made here.

Figure 3:
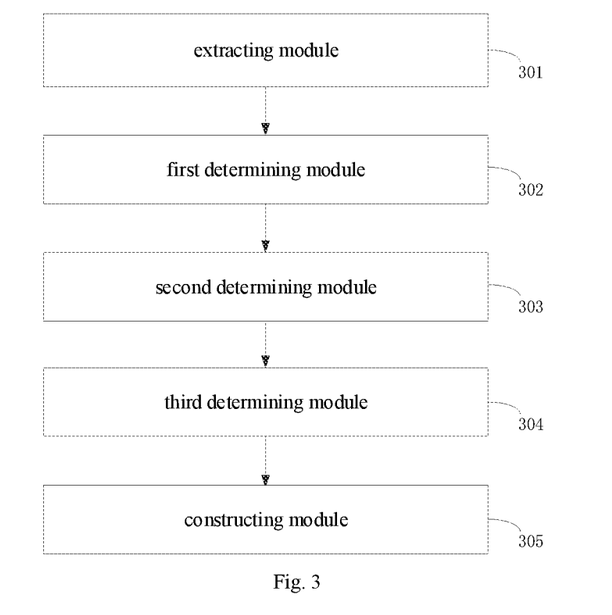
FIG. 3 is a block diagram of an image processing apparatus shown according to an exemplary embodiment.

An embodiment of the present disclosure provides an image processing apparatus. Referring to FIG. 3, which is a block diagram of an image processing apparatus shown according to an exemplary embodiment, this apparatus includes an extracting module 301, a first determining module 302, a second determining module 303, a third determining module 304 and a constructing module 305.

The extracting module 301 is configured to extract a red, green and blue channel image and a white channel image from a target image.

The first determining module 302 is configured to determine a first gray-scale component image of the red, green and blue channel image, and determine a second gray-scale component image of the white channel image.

The second determining module 303 is configured to determine first decomposed sub-band information of the first gray-scale component image, and determine second decomposed sub-band information of the second gray-scale component image. The first decomposed sub-band information includes at least one decomposition level, each decomposition level includes at least one frequency band, and each frequency band corresponds to a frequency band coefficient matrix. The second decomposed sub-band information includes at least one decomposition level, each decomposition level includes at least one frequency band, and each frequency band corresponds to a frequency band coefficient matrix;

The third determining module 304 is configured to determine third decomposed sub-band information according to the first decomposed sub-band information and the second decomposed sub-band information.

The constructing module 305 is configured to perform image reconstruction according to the third decomposed sub-band information to obtain a third gray-scale component image, and constructing a color image corresponding to the target image according to the third gray-scale component image.

An embodiment of the present disclosure provides an image processing apparatus, which includes the apparatus shown in FIG. 3.

Further, the second determining module 303 is further configured to determine the first decomposed sub-band information of the first gray-scale component image, and determine the second decomposed sub-band information of the second gray-scale component image by using an image multi-scale decomposition method to determine the first decomposed sub-band information of the first gray-scale component image and determine the second decomposed sub-band information of the second gray-scale component image.

The number of decomposition levels in the first decomposed sub-band information and the number of decomposition levels in the second decomposed sub-band information are the same, and the number of frequency bands in each decomposition level is the same.

An embodiment of the present disclosure provides an image processing apparatus, which includes the apparatus shown in FIG. 3.

Further, the third determining module 304 is further configured to determine the third decomposed sub-band information according to the first decomposed sub-band information and the second decomposed sub-band information by: taking the same frequency band of the first decomposed sub-band information and the second decomposed sub-band information under the same decomposition level as the corresponding frequency band of the third decomposed sub-band information under this decomposition level; and for each frequency band in the third decomposed sub-band information under the respective decomposition levels, calculating the frequency band coefficient matrix of the corresponding frequency band in the third decomposed sub-band information according to the frequency band coefficient matrix of the corresponding frequency band in the first decomposed sub-band information and the frequency band coefficient of the corresponding frequency band in the second decomposed sub-band information matrix.

An embodiment of the present disclosure provides an image processing apparatus, which includes the apparatus shown in FIG. 3.

Further, the second determining module 303 is further configured to determine the third decomposed sub-band information according to the first decomposed sub-band information and the second decomposed sub-band information by:

for a set high frequency band in the third decomposed sub-band information, determining the frequency band coefficient matrix of the set high frequency band in the second decomposed sub-band information as the frequency band coefficient matrix of the set corresponding high frequency band in the third decomposed sub-band information;

for each frequency band in the third decomposed sub-band information except the set high frequency band, determining the coefficient value corresponding to each pixel point in the frequency band coefficient matrix of each frequency band in the third decomposed sub-band information, as the average value of the coefficient value of the corresponding pixel point in the frequency band coefficient matrix of the corresponding frequency band in the first decomposed sub-band information and the coefficient value of the corresponding pixel point in the frequency band coefficient matrix of the corresponding frequency band in the second decomposed sub-band information.

An embodiment of the present disclosure provides an image processing apparatus, which includes the apparatus shown in FIG. 3.

Further, the second determining module 303 is further configured to determine the third decomposed sub-band information according to the first decomposed sub-band information and the second decomposed sub-band information by:

determining the frequency band coefficient matrix of the third decomposed sub-band information in each frequency band, as the sum of a first matrix, which is a product of a corresponding weighting coefficient with the frequency band coefficient matrix of the first decomposed sub-band information on the corresponding frequency band, and a second matrix, which is a product of a corresponding weighting coefficient with the frequency band coefficient matrix of the second decomposed sub-band information on the corresponding frequency band.

The sum of the corresponding weighting coefficients of the first decomposed sub-band information and the second decomposed sub-band information on the same frequency band is 1, and the corresponding weighting coefficient of the second decomposed sub-band information on the set high frequency band is greater than corresponding weighting coefficients on frequency bands other than the set high frequency band.

An embodiment of the present disclosure provides an image processing apparatus, which includes the apparatus shown in FIG. 3.

Further, the second determining module 303 is further configured to determine the third decomposed sub-band information according to the first decomposed sub-band information and the second decomposed sub-band information by:

determining the frequency band coefficient matrix of the third decomposed sub-band information in each frequency band, as the sum of a third matrix, which is a product of a corresponding weighting coefficient with the frequency band coefficient matrix of the first decomposed sub-band information on the corresponding frequency band, and a fourth matrix, which is a product of a corresponding weighting coefficient with the frequency band coefficient matrix of the second decomposed sub-band information on the corresponding frequency band.

The sum of the corresponding weighting coefficients of the first decomposed sub-band information and the second decomposed sub-band information on the same frequency band is 1; and the corresponding weighting coefficient of the second decomposed sub-band information on a frequency band is negatively correlated to the number of decomposition levels to which the frequency band belongs.

An embodiment of the present disclosure provides an image processing apparatus, which includes the apparatus shown in FIG. 3.

Further, the second determining module 303 is further configured to determine the third decomposed sub-band information according to the first decomposed sub-band information and the second decomposed sub-band information by:

for a set high frequency band in the third decomposed sub-band information, determining the frequency band coefficient matrix of the set high frequency band in the second decomposed sub-band information as the frequency band coefficient matrix of the set corresponding high frequency band in the third decomposed sub-band information;

for each frequency band in the third decomposed sub-band information except the set high frequency band, determining the frequency band coefficient matrix of the third decomposed sub-band information in each frequency band, as the sum of a fifth matrix, which is a product of a corresponding weighting coefficient with the frequency band coefficient matrix of the first decomposed sub-band information on the corresponding frequency band, and a sixth matrix, which is a product of a corresponding weighting coefficient with the frequency band coefficient matrix of the second decomposed sub-band information on the corresponding frequency band.

The sum of the corresponding weighting coefficients of the first decomposed sub-band information and the second decomposed sub-band information on the same frequency band is 1; and the corresponding weighting coefficient of the second decomposed sub-band information on a frequency band is negatively correlated to the number of decomposition levels to which the frequency band belongs.

An embodiment of the present disclosure provides an image processing apparatus, which includes the apparatus shown in FIG. 3.

Moreover, the second determining module 303 is further configured to determine the third decomposed sub-band information according to the first decomposed sub-band information and the second decomposed sub-band information by:

determining the frequency band coefficient matrix of each frequency band in the third decomposed sub-band information is the sum of a seventh matrix, which is a dot product matrix of the frequency band coefficient matrix of the corresponding frequency band in the first decomposed sub-band information with the weighting coefficient matrix of the corresponding frequency band in the first decomposed sub-band information, and an eighth matrix, which is a dot product matrix of the frequency band coefficient matrix of the corresponding frequency band in the second decomposed sub-band information with the weighting coefficient matrix of the corresponding frequency band in the second decomposed sub-band information.

The weighting coefficient value of each pixel point in the weighting coefficient matrix of each frequency band in the first decomposed sub-band information is calculated and obtained according to a first variance corresponding to each pixel point in the decomposed image of the first gray-scale component image in the corresponding frequency band.

The weighting coefficient value of each pixel point in the weighting coefficient matrix of each frequency band in the second decomposed sub-band information is calculated and obtained according to a second variance corresponding to each pixel point in the decomposed image of the second gray-scale component image in the corresponding frequency band.

The sum of the weighting coefficients corresponding to the same pixel point in the decomposed images of the first gray-scale component image and the second gray-scale component image in the same frequency band is 1; the weighting coefficient corresponding to each pixel point in the decomposed image of the first gray-scale component image on each frequency band is positively correlated with the first variance corresponding to the corresponding pixel point, and the weighting coefficient corresponding to each pixel point in the decomposed image of the second gray-scale component image on each frequency band is positively correlated with the second variance corresponding to the corresponding pixel point.

An embodiment of the present disclosure provides an image processing apparatus. The apparatus includes a processor and a memory configured to store instructions executable by the processor. The processor is configured to execute the above described method.

An embodiment of the present disclosure provides a non-transitory computer-readable storage medium. Instructions in the storage medium, when being executed by a processor of a mobile terminal, enable the mobile terminal to execute the above described method.

Figure 4:
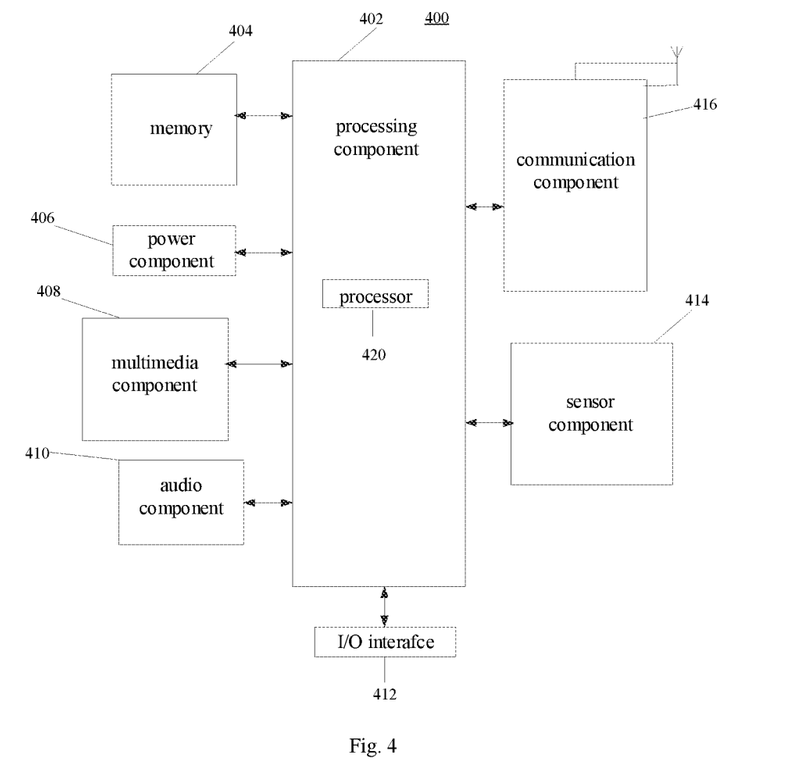
FIG. 4 is a block diagram of an image processing apparatus shown according to an exemplary embodiment.

FIG. 4 is a block diagram of an image processing apparatus 400 shown according to an exemplary embodiment. For example, the apparatus 400 may be a mobile phone, a computer, a digital broadcast terminal, a messaging device, a gaming console, a tablet, a medical device, exercise equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For instance, the sensor component 414 may detect an open/closed status of the apparatus 400, relative positioning of components, e.g., the display and the keypad, of the apparatus 400, a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G or 3G or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 404, executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An image processing method, performed by a mobile terminal, the method comprising:
   extracting a red, green and blue channel image and a white channel image from a target image;
   determining a first gray-scale component image of the red, green and blue channel image, and determining a second gray-scale component image of the white channel image;
   determining first decomposed sub-band information of the first gray-scale component image, and determining second decomposed sub-band information of the second gray-scale component image, in which the first decomposed sub-band information comprises at least one decomposition level, each decomposition level comprises at least one frequency band, and each frequency band corresponds to a frequency band coefficient matrix, in which the second decomposed sub-band information comprises at least one decomposition level, each decomposition level comprises at least one frequency band, and each frequency band corresponds to a frequency band coefficient matrix;
   determining third decomposed sub-band information according to the first decomposed sub-band information and the second decomposed sub-band information; and
   performing image reconstruction according to the third decomposed sub-band information to obtain a third gray-scale component image, and constructing a color image corresponding to the target image according to the third gray-scale component image;

wherein determining the third decomposed sub-band information according to the first decomposed sub-band information and the second decomposed sub-band information comprises:
taking the same frequency band of the first decomposed sub-band information and the second decomposed sub-band information under the same decomposition level as the corresponding frequency band of the third decomposed sub-band information under the decomposition level; and
for each frequency band in the third decomposed sub-band information under respective decomposition levels, calculating the frequency band coefficient matrix of the corresponding frequency band in the third decomposed sub-band information according to the frequency band coefficient matrix of the corresponding frequency band in the first decomposed sub-band information and the frequency band coefficient of the corresponding frequency band in the second decomposed sub-band information matrix.

2. The image processing method of claim 1, wherein determining the first decomposed sub-band information of the first gray-scale component image, and determining the second decomposed sub-band information of the second gray-scale component image comprises:
determining the first decomposed sub-band information of the first gray-scale component image and determining the second decomposed sub-band information of the second gray-scale component image by using an image multi-scale decomposition method;
wherein a number of decomposition levels in the first decomposed sub-band information and a number of decomposition levels in the second decomposed sub-band information are the same, and a number of frequency bands in each decomposition level is the same.

3. The image processing method of claim 1, wherein determining the third decomposed sub-band information according to the first decomposed sub-band information and the second decomposed sub-band information comprises:
for a set high frequency band in the third decomposed sub-band information, determining the frequency band coefficient matrix of the set high frequency band in the second decomposed sub-band information as the frequency band coefficient matrix of a corresponding set high frequency band in the third decomposed sub-band information;
for each frequency band in the third decomposed sub-band information except the set high frequency band, determining a coefficient value corresponding to each pixel point in the frequency band coefficient matrix of each frequency band in the third decomposed sub-band information, as an average value of a coefficient value of the corresponding pixel point in the frequency band coefficient matrix of the corresponding frequency band in the first decomposed sub-band information and a coefficient value of the corresponding pixel point in the frequency band coefficient matrix of the corresponding frequency band in the second decomposed sub-band information.

4. The image processing method of claim 1, wherein determining the third decomposed sub-band information according to the first decomposed sub-band information and the second decomposed sub-band information comprises:
determining the frequency band coefficient matrix of the third decomposed sub-band information in each frequency band, as a sum of a first matrix and a second matrix, in which the first matrix is a product of a corresponding weighting coefficient with the frequency band coefficient matrix of the first decomposed sub-band information on the corresponding frequency band, and the second matrix is a product of a corresponding weighting coefficient with the frequency band coefficient matrix of the second decomposed sub-band information on the corresponding frequency band;
wherein a sum of the corresponding weighting coefficients of the first decomposed sub-band information and the second decomposed sub-band information on the same frequency band is 1, and the corresponding weighting coefficient of the second decomposed sub-band information on a set high frequency band is greater than corresponding weighting coefficients on frequency bands other than the set high frequency band.

5. The image processing method of claim 1, wherein determining the third decomposed sub-band information according to the first decomposed sub-band information and the second decomposed sub-band information comprises:
determining the frequency band coefficient matrix of the third decomposed sub-band information in each frequency band, as a sum of a third matrix and a fourth matrix, in which the third matrix is a product of a corresponding weighting coefficient with the frequency band coefficient matrix of the first decomposed sub-band information on the corresponding frequency band, and the fourth matrix is a product of a corresponding weighting coefficient with the frequency band coefficient matrix of the second decomposed sub-band information on the corresponding frequency band;
wherein a sum of the corresponding weighting coefficients of the first decomposed sub-band information and the second decomposed sub-band information on the same frequency band is 1; and the corresponding weighting coefficient of the second decomposed sub-band information on a frequency band is negatively correlated to a number of decomposition levels to which the frequency band belongs.

6. The image processing method of claim 1, wherein determining the third decomposed sub-band information according to the first decomposed sub-band information and the second decomposed sub-band information comprises:
for a set high frequency band in the third decomposed sub-band information, determining the frequency band coefficient matrix of the set high frequency band in the second decomposed sub-band information as the frequency band coefficient matrix of a corresponding set high frequency band in the third decomposed sub-band information;
for each frequency band in the third decomposed sub-band information except the set high frequency band, determining the frequency band coefficient matrix of the third decomposed sub-band information in each frequency band, as a sum of a fifth matrix and a sixth matrix, in which the fifth matrix is a product of a corresponding weighting coefficient with the frequency band coefficient matrix of the first decomposed sub-band information on the corresponding frequency band, and the sixth matrix is a product of a corresponding weighting coefficient with the frequency band coefficient matrix of the second decomposed sub-band information on the corresponding frequency band;

wherein a sum of the corresponding weighting coefficients of the first decomposed sub-band information and the second decomposed sub-band information on the same frequency band is 1; and the corresponding weighting coefficient of the second decomposed sub-band information on a frequency band is negatively correlated to a number of decomposition levels to which the frequency band belongs.

7. The image processing method of claim 1, wherein determining the third decomposed sub-band information according to the first decomposed sub-band information and the second decomposed sub-band information comprises:

determining the frequency band coefficient matrix of each frequency band in the third decomposed sub-band information as a sum of a seventh matrix and an eighth matrix, in which the seventh matrix is a dot product matrix of the frequency band coefficient matrix of the corresponding frequency band in the first decomposed sub-band information with a weighting coefficient matrix of the corresponding frequency band in the first decomposed sub-band information, and the eighth matrix is a dot product matrix of the frequency band coefficient matrix of the corresponding frequency band in the second decomposed sub-band information with a weighting coefficient matrix of the corresponding frequency band in the second decomposed sub-band information;

wherein a weighting coefficient value of each pixel point in a weighting coefficient matrix of each frequency band in the first decomposed sub-band information is calculated and obtained according to a first variance corresponding to each pixel point in a decomposed image of the first gray-scale component image in the corresponding frequency band;

wherein a weighting coefficient value of each pixel point in the weighting coefficient matrix of each frequency band in the second decomposed sub-band information is calculated and obtained according to a second variance corresponding to each pixel point in a decomposed image of the second gray-scale component image in the corresponding frequency band;

wherein a sum of the weighting coefficients corresponding to the same pixel point in the decomposed images of the first gray-scale component image and the second gray-scale component image in the same frequency band is 1; the weighting coefficient corresponding to each pixel point in the decomposed image of the first gray-scale component image on each frequency band is positively correlated with the first variance corresponding to the corresponding pixel point, and the weighting coefficient corresponding to each pixel point in the decomposed image of the second gray-scale component image on each frequency band is positively correlated with the second variance corresponding to the corresponding pixel point.

8. An image processing apparatus included in a mobile terminal, comprising:
a processor; and
a memory, configured to store instructions executable by the processor,
wherein the processor is configured to:
extract a red, green and blue channel image and a white channel image from a target image;

determine a first gray-scale component image of the red, green and blue channel image, and determine a second gray-scale component image of the white channel image;

determine first decomposed sub-band information of the first gray-scale component image, and determine second decomposed sub-band information of the second gray-scale component image, wherein the first decomposed sub-band information comprises at least one decomposition level, each decomposition level comprises at least one frequency band, and each frequency band corresponds to a frequency band coefficient matrix, wherein the second decomposed sub-band information comprises at least one decomposition level, each decomposition level comprises at least one frequency band, and each frequency band corresponds to a frequency band coefficient matrix;

determine third decomposed sub-band information according to the first decomposed sub-band information and the second decomposed sub-band information;

perform image reconstruction according to the third decomposed sub-band information to obtain a third gray-scale component image, and constructing a color image corresponding to the target image according to the third gray-scale component image;

wherein the processor is configured to:
take the same frequency band of the first decomposed sub-band information and the second decomposed sub-band information under the same decomposition level as the corresponding frequency band of the third decomposed sub-band information under the decomposition level; and for each frequency band in the third decomposed sub-band information under respective decomposition levels, calculate the frequency band coefficient matrix of the corresponding frequency band in the third decomposed sub-band information according to the frequency band coefficient matrix of the corresponding frequency band in the first decomposed sub-band information and the frequency band coefficient of the corresponding frequency band in the second decomposed sub-band information matrix.

9. The image processing apparatus of claim 8, wherein the processor is configured to:
determine the first decomposed sub-band information of the first gray-scale component image and determine the second decomposed sub-band information of the second gray-scale component image by using an image multi-scale decomposition method;
wherein a number of decomposition levels in the first decomposed sub-band information and a number of decomposition levels in the second decomposed sub-band information are the same, and a number of frequency bands in each decomposition level is the same.

10. The image processing apparatus of claim 8, wherein the processor is configured to:
for a set high frequency band in the third decomposed sub-band information, determine the frequency band coefficient matrix of the set high frequency band in the second decomposed sub-band information as the frequency band coefficient matrix of a corresponding set high frequency band in the third decomposed sub-band information;

for each frequency band in the third decomposed sub-band information except the set high frequency band, determine a coefficient value corresponding to each pixel point in the frequency band coefficient matrix of each frequency band in the third decomposed sub-band information, as an average value of a coefficient value of the corresponding pixel point in the frequency band coefficient matrix of the corresponding frequency band in the first decomposed sub-band information and a coefficient value of the corresponding pixel point in the frequency band coefficient matrix of the corresponding frequency band in the second decomposed sub-band information.

11. The image processing apparatus of claim 8, wherein the processor is configured to:

determine the frequency band coefficient matrix of the third decomposed sub-band information in each frequency band, as a sum of a first matrix and a second matrix, in which the first matrix is a product of a corresponding weighting coefficient with the frequency band coefficient matrix of the first decomposed sub-band information on the corresponding frequency band, and the second matrix is a product of a corresponding weighting coefficient with the frequency band coefficient matrix of the second decomposed sub-band information on the corresponding frequency band;

wherein a sum of the corresponding weighting coefficients of the first decomposed sub-band information and the second decomposed sub-band information on the same frequency band is 1, and the corresponding weighting coefficient of the second decomposed sub-band information on a set high frequency band is greater than corresponding weighting coefficients on frequency bands other than the set high frequency band.

12. The image processing apparatus of claim 8, wherein the processor is configured to:

determine the frequency band coefficient matrix of the third decomposed sub-band information in each frequency band, as a sum of a third matrix and a fourth matrix, in which the third matrix is a product of a corresponding weighting coefficient with the frequency band coefficient matrix of the first decomposed sub-band information on the corresponding frequency band, and the fourth matrix is a product of a corresponding weighting coefficient with the frequency band coefficient matrix of the second decomposed sub-band information on the corresponding frequency band;

wherein a sum of the corresponding weighting coefficients of the first decomposed sub-band information and the second decomposed sub-band information on the same frequency band is 1; and the corresponding weighting coefficient of the second decomposed sub-band information on a frequency band is negatively correlated to a number of decomposition levels to which the frequency band belongs.

13. The image processing apparatus of claim 8, wherein the processor is configured to:

for a set high frequency band in the third decomposed sub-band information, determine the frequency band coefficient matrix of the set high frequency band in the second decomposed sub-band information as the frequency band coefficient matrix of a corresponding set high frequency band in the third decomposed sub-band information;

for each frequency band in the third decomposed sub-band information except the set high frequency band, determine the frequency band coefficient matrix of the third decomposed sub-band information in each frequency band, as a sum of a fifth matrix and a sixth matrix, in which the fifth matrix is a product of a corresponding weighting coefficient with the frequency band coefficient matrix of the first decomposed sub-band information on the corresponding frequency band, and the sixth matrix is a product of a corresponding weighting coefficient with the frequency band coefficient matrix of the second decomposed sub-band information on the corresponding frequency band;

wherein a sum of the corresponding weighting coefficients of the first decomposed sub-band information and the second decomposed sub-band information on the same frequency band is 1; and the corresponding weighting coefficient of the second decomposed sub-band information on a frequency band is negatively correlated to a number of decomposition levels to which the frequency band belongs.

14. The image processing apparatus of claim 8, wherein the processor is configured to:

determine the frequency band coefficient matrix of each frequency band in the third decomposed sub-band information as a sum of a seventh matrix and an eighth matrix, in which the seventh matrix is a dot product matrix of the frequency band coefficient matrix of the corresponding frequency band in the first decomposed sub-band information with a weighting coefficient matrix of the corresponding frequency band in the first decomposed sub-band information, and the eighth matrix is a dot product matrix of the frequency band coefficient matrix of the corresponding frequency band in the second decomposed sub-band information with a weighting coefficient matrix of the corresponding frequency band in the second decomposed sub-band information;

wherein a weighting coefficient value of each pixel point in a weighting coefficient matrix of each frequency band in the first decomposed sub-band information is calculated and obtained according to a first variance corresponding to each pixel point in a decomposed image of the first gray-scale component image in the corresponding frequency band;

wherein a weighting coefficient value of each pixel point in the weighting coefficient matrix of each frequency band in the second decomposed sub-band information is calculated and obtained according to a second variance corresponding to each pixel point in a decomposed image of the second gray-scale component image in the corresponding frequency band;

wherein a sum of the weighting coefficients corresponding to the same pixel point in the decomposed images of the first gray-scale component image and the second gray-scale component image in the same frequency band is 1; the weighting coefficient corresponding to each pixel point in the decomposed image of the first gray-scale component image on each frequency band is positively correlated with the first variance corresponding to the corresponding pixel point, and the weighting coefficient corresponding to each pixel point in the decomposed image of the second gray-scale component image on each frequency band is positively correlated with the second variance corresponding to the corresponding pixel point.

15. A non-transitory computer-readable storage medium, wherein instructions in the storage medium, when being executed by a processor of a mobile terminal, enable the mobile terminal to execute an image processing method, the method comprising:

extracting a red, green and blue channel image and a white channel image from a target image;

determining a first gray-scale component image of the red, green and blue channel image, and determining a second gray-scale component image of the white channel image;

determining first decomposed sub-band information of the first gray-scale component image, and determining second decomposed sub-band information of the second gray-scale component image, wherein the first decomposed sub-band information comprises at least one decomposition level, each decomposition level comprises at least one frequency band, and each frequency band corresponds to a frequency band coefficient matrix, wherein the second decomposed sub-band information comprises at least one decomposition level, each decomposition level comprises at least one frequency band, and each frequency band corresponds to a frequency band coefficient matrix;

determining third decomposed sub-band information according to the first decomposed sub-band information and the second decomposed sub-band information; and performing image reconstruction according to the third decomposed sub-band information to obtain a third gray-scale component image, and constructing a color image corresponding to the target image according to the third gray-scale component image;

wherein determining the third decomposed sub-band information according to the first decomposed sub-band information and the second decomposed sub-band information comprises:

taking the same frequency band of the first decomposed sub-band information and the second decomposed sub-band information under the same decomposition level as the corresponding frequency band of the third decomposed sub-band information under the decomposition level; and for each frequency band in the third decomposed sub-band information under respective decomposition levels, calculating the frequency band coefficient matrix of the corresponding frequency band in the third decomposed sub-band information according to the frequency band coefficient matrix of the corresponding frequency band in the first decomposed sub-band information and the frequency band coefficient of the corresponding frequency band in the second decomposed sub-band information matrix.

\* \* \* \* \*